(12) United States Patent
Bissontz

(10) Patent No.: US 8,606,453 B2
(45) Date of Patent: Dec. 10, 2013

(54) HYBRID VEHICLE PRIME MOVERS COMMUNICATION CONTROL STRATEGY

(75) Inventor: Jay E Bissontz, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/583,388

(22) PCT Filed: Mar. 8, 2010

(86) PCT No.: PCT/US2010/026525
§ 371 (c)(1),
(2), (4) Date: Sep. 7, 2012

(87) PCT Pub. No.: WO2011/112176
PCT Pub. Date: Sep. 15, 2011

(65) Prior Publication Data
US 2013/0030632 A1  Jan. 31, 2013

(51) Int. Cl.
*B60L 9/00* (2006.01)
*G06F 7/00* (2006.01)
*B60K 17/28* (2006.01)
*B60W 10/00* (2006.01)
*B60G 17/00* (2006.01)

(52) U.S. Cl.
USPC ......... 701/22; 701/55; 180/53.1; 180/65.265; 280/6.15

(58) Field of Classification Search
USPC .................. 701/22, 55; 180/68.25; 903/930
See application file for complete search history.

(56) References Cited

U.S. PATENT DOCUMENTS

| | | | |
|---|---|---|---|
| 5,854,454 A | 12/1998 | Upender et al. | |
| 6,272,402 B1 | 8/2001 | Kelwaski | |
| 6,963,796 B2 | 11/2005 | Larson et al. | |
| 7,281,595 B2 * | 10/2007 | Bissontz | 180/65.28 |
| 7,611,154 B2 * | 11/2009 | Delaney | 280/6.15 |
| 2005/0089059 A1 | 4/2005 | Kurita | |
| 2009/0111652 A1 | 4/2009 | Reedy et al. | |
| 2009/0204280 A1 | 8/2009 | Simon, Jr. et al. | |
| 2009/0294191 A1 | 12/2009 | Sheidler | |
| 2010/0010706 A1 | 1/2010 | Gormley | |
| 2011/0224858 A1 * | 9/2011 | Bissontz | 701/22 |
| 2011/0231046 A1 * | 9/2011 | Bissontz | 701/22 |
| 2012/0323428 A1 * | 12/2012 | Bissontz | 701/22 |

* cited by examiner

*Primary Examiner* — Thomas Black
*Assistant Examiner* — Tyler Paige
(74) *Attorney, Agent, or Firm* — Jeffrey P. Calfa; Mark C. Bach

(57) ABSTRACT

Messaging in a controller area network is modified to hide thermal engine torque and angular velocity change requests originating with selected nodes with relatively low contention access priority from an engine controller and to route the messages instead through an intermediary controller which is an independent source of thermal engine torque and angular velocity change requests. More specifically, in a hybrid vehicle having a body controller with operational control over power take off equipment, a hybrid controller and a thermal engine controller, angular velocity and torque change requests to support power take off operation are embedded in auxiliary input/output messages. The hybrid controller operates on these auxiliary messages, conflating the embedded angular velocity and torque change requests with its own and rebroadcast in conventional form.

6 Claims, 2 Drawing Sheets

HYBRID VEHICLE PRIME MOVERS COMMUNICATION CONTROL STRATEGY

BACKGROUND

1. Technical Field

The technical field relates generally to motor vehicle controller area networks and, more particularly, to modification of the communication strategy for hybrid vehicles to avoid conflicting responses by controllers to messages broadcast on the network bus.

2. Description of the Problem

Hybrid vehicles are generally equipped with at least two prime movers for developing mechanical power. One prime mover may be a dual function system that can develop mechanical power both for traction or power for take-off (PTO) equipment and which can be backdriven as a step in the conversion of mechanical energy to potential energy for storage. An electric traction motor which can be used for regenerative braking of the vehicle to generate electricity is suitable as such a prime mover, as are pneumatic and hydraulic accumulator based systems and mechanical fly wheels. The other prime mover is typically a thermal engine such as an internal combustion engine (ICE) which may supply mechanical power for traction, to backdrive the electric traction motor for the generation of electricity, to run a generator, and may be able to provide non-regenerative vehicle braking (e.g., engine or "Jake" brakes). The internal combustion engine for a hybrid-ICE/electric vehicle will be called on to carry out at least one of the listed functions and in some parallel type hybrid vehicles will perform more than one.

The development of vocational commercial truck chassis configured with hybrid electric drive systems which can propel the vehicle as well as provide angular velocity to PTO equipment has increased the complexity of integration of the chassis's systems (and subsystems), the hybrid electric system and installed PTO equipment, particularly on parallel type hybrid vehicles. One consequence of this increased complexity is reflected in the potential for increased data traffic on the controller area network [CAN] relating to managing the variable rate of change in the angular velocity and moment of inertia of the thermal/internal combustion engine under the management of an engine controller. Multiple controllers or "nodes" on the CAN can be the source of torque/speed requests to which the engine controller is programmed to respond. Among the possible sources of such broadcasts are a transmission controller, an ABS controller, a body controller, and a hybrid controller. The messages generated by the different sources can easily be in conflict with one another with respect to changes in angular speed and torque requested from the thermal engine.

Conflicts in the timing of messages are handled through a control strategy referred to as, "non-destructive bit wise arbitration". Arbitration priorities contained in the CAN message structure establish which among conflicting messages has priority to the serial communication bus of the network. If the source of the speed/torque message has a high enough arbitration priority (i.e., a low absolute numeric value), and the other node(s) on the CAN bus with a higher priorities are not in direct conflict with the immediate source, then the controller for the thermal engine responds to the speed/torque message and adjusts the output of the thermal engine accordingly. However, the lower priority node may attempt to broadcast its request following handling of the original request. Where the follow up message changes the result from the original message, variation in the thermal engine's output can result. In addition, data traffic on the serial communication bus can began to increase with data traffic, particularly relating to operation of the thermal engine, but affecting access to the bus generally.

A parallel hybrid vehicle with PTO capability greatly increases the chances for conflicting requests for changes in thermal engine angular speed and torque messages. For example, in a conventional (non-hybrid) vehicle, if the operator of the vehicle desires to increase the thermal engine's angular velocity by the means of a remotely mounted engine speed control device, he could do so through a sensor connected to the body controller which would in turn process and condition the input data as output data for broadcast on the CAN bus as a speed/torque message. A vehicle "up-fitted" for hybrid operation with an electric traction motor/generator which can act as a prime mover in conjunction with the thermal engine to supply angular velocity and torque changes the issue. In this configuration both the hybrid controller and the thermal engine controller will have the task of "co-managing" operation of the thermal engine to adjust the output of the thermal engine depending upon the availability of speed or torque from the electric traction motor/generator. This co-management strategy can become very complex considering the many real time transitions which will take place requiring the thermal engine to act as the prime mover exclusively (the motor/generator operating to charge the battery pack under power from the thermal engine) or the hybrid electric traction motor/generator acting as the prime mover supporting electrified power take off (ePTO) operation.

SUMMARY

Controller area network messaging is modified to hide thermal engine torque and angular velocity change requests originating with selected nodes with relatively low contention access priority from an engine controller and to route the messages instead through an intermediary controller which is an independent source of thermal engine torque and angular velocity change requests. This creates a logical series relationship among the controllers involved. Here it is contemplated that engine torque and angular velocity requests relating to PTO operation, which typically are broadcast by a body controller, a relatively low priority controller, be routed through the hybrid controller, a higher priority controller and one which is a also a source of angular velocity and torque change requests and the controller which is the most likely source of conflicting change requests for the body controller. More specifically, when the body controller determines a need for a change in thermal engine output it broadcasts an auxiliary datalink messages (in the SAE J1939 standard an auxiliary input output or "auxio" messages with an eight byte data field) in which angular velocity and torque level change requests for the engine controller are embedded. The hybrid controller is programmed to recognize the auxiliary datalink messages and conflate the embedded requests with its own torque and angular speed change requests and to broadcast the conflated request in a single message of a type recognized by the engine controller. The engine controller is not programmed to respond to the auxiliary input/output message.

DETAILED DESCRIPTION

In the following detailed description example sizes/models/values/ranges may be given with respect to specific embodiments but are not to be considered generally limiting.

Figure 1:
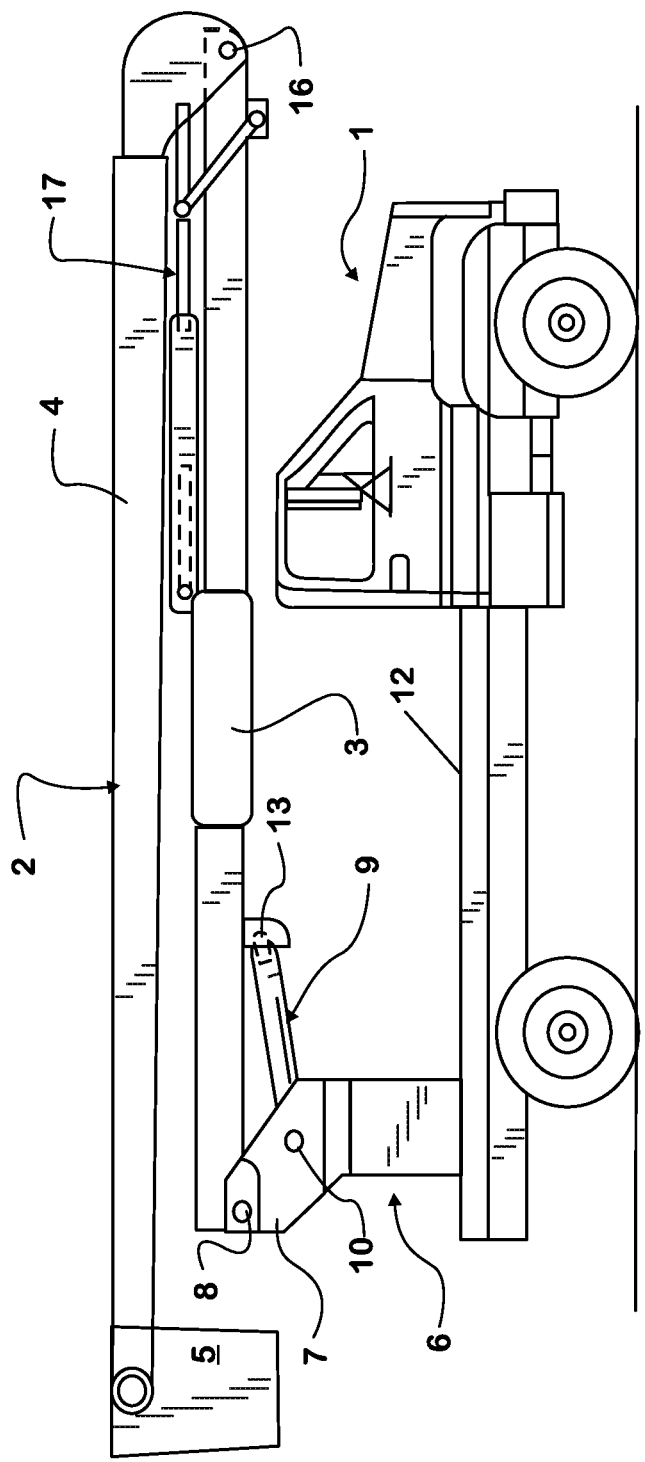
FIG. 1 is a side view of hybrid-electric vehicle carrying a power take-off operation.

Referring now to the figures and in particular to FIG. 1, a hybrid mobile aerial lift truck 1 is illustrated. Hybrid mobile aerial lift truck 1 serves as an example of a medium duty commercial vehicle which supports a PTO vocation. The hybrid mobile aerial lift truck 1 includes a PTO load, here an aerial lift unit 2 mounted on a truck bed 12. Chassis inputs distributed around the hybrid mobile aerial lift truck 1 may be used to control deployment and positioning of the aerial lift unit 2 and other elements such as outriggers or drills for PTO. The operator will usually specifically activate PTO by use of a dedicated switch which may establish a controlling location or by throttle like controls located on the vehicle body.

The aerial lift unit 2 includes a lower boom 3 and an upper boom 4 pivotally interconnected to each other. The lower boom 3 is in turn mounted to rotate on the truck bed 12 on a support 6 and rotatable support bracket 7. The rotatable support bracket 7 includes a pivoting mount 8 for one end of lower boom 3. A bucket 5 is secured to the free end of upper boom 4. Bucket 5 is pivotally attached to the free end of boom 4 to maintain a horizontal orientation at all times. A hydraulic lifting unit 9 is interconnected between bracket 7 and the lower boom 3 by pivot connection 10 to the bracket 7 pivot 13 on the lower boom 3. Hydraulic lifting unit 9 is connected to a pressurized supply of a suitable hydraulic fluid, which allows the assembly to be lifted and lowered. The primary source of pressurized hydraulic fluid may be a pump powered by either (or both) of two prime movers for hybrid mobile aerial lift truck 1. Typically an internal combustion engine and an electric traction motor serve as the prime movers. The outer end of the lower boom 3 is interconnected to the lower and pivot end of the upper boom 4. A pivot 16 interconnects the outer end of the lower boom 3 to the pivot end of the upper boom 4. An upper boom compensating assembly 17 is connected between the lower boom 3 and the upper boom 4 for moving the upper boom about pivot 16 to position the upper boom relative to the lower boom 3. The upper-boom, compensating assembly 17 allows independent movement of the upper boom 4 relative to lower boom 3 and provides compensating motion between the booms to raise the upper boom with the lower boom. Upper boom compensating assembly 17 is usually supplied with pressurized hydraulic fluid from the same sources as hydraulic lifting unit 9. Outriggers (not shown) may be used installed at the corners of the truck bed 12. Pressurized hydraulic fluid for these operations may be supplied by a PTO hydraulic pump.

Many contemporary vehicles provide integration over the control of multiple vehicle systems through use of a controller area network (CAN). A CAN is a multiple master serial data bus for connecting local nodes over the serial data bus. Messages on the serial data bus are not addressed as such but are broadcast. The controllers are usually functionally specialized to provide engine control, anti-lock braking control, transmission control, and so on. The specialized controllers are one type of CAN bus node. Any controller may be programmed to respond to the broadcast messages. Conflict for access to the bus is handled by the relative dominance of the identifier field for the data (which can reflect the source), which occurs immediately after the start-of-frame field. For example, messages from the anti-lock brake controller are given the highest priority in the Society of Automotive Engineers J1939 standard. Each type of message has a unique priority. The J1939 standard provides for torque speed request messages for the engine controller from any one of several controllers including a general body controller (typically in response to demands for power take-off applications), the anti-lock braking system controller and, on hybrid vehicles, the hybrid controller.

Figure 2:
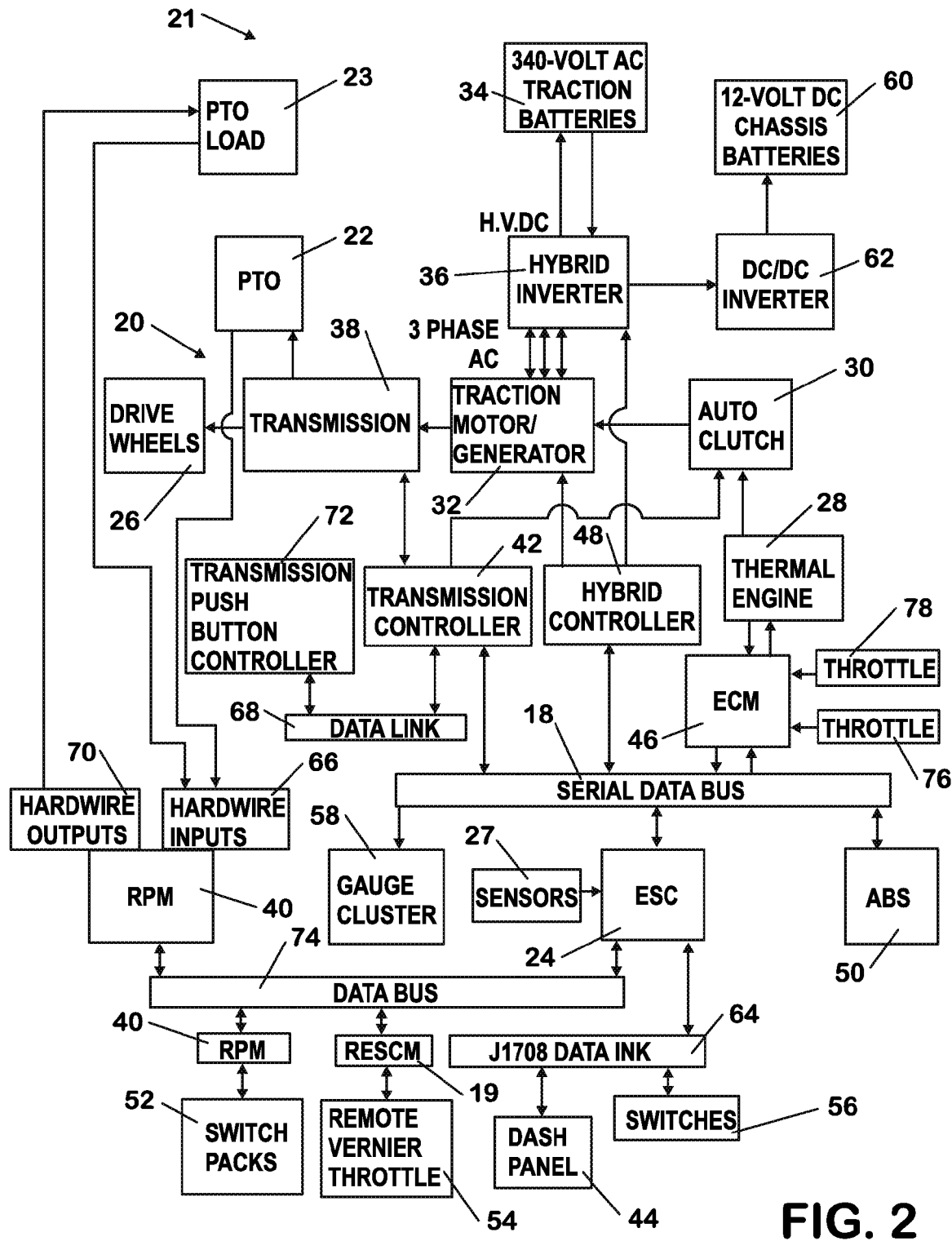
FIG. 2 is a high level schematic of a vehicle drive train and vehicle control system for a hybrid-electric vehicle.

Referring to FIG. 2, a high level schematic of a control system 21 implemented using a CAN and a vehicle drive train 20 for a hybrid mobile aerial lift truck 1 or other types of vocational commercial vehicles is illustrated. As part of the overall control scheme, requests for increases or decreases in angular velocity and torque for various applications, including a PTO application/device 22, are handled. One potential source of requests for changes in available angular speed torque on the drive train, including from a thermal engine 28, is an electrical system controller (ESC)/body controller 24. ESC 24 is linked by a Society of Automotive Engineers (SAE) J1939 standard compliant serial data bus 18 to a variety of local controllers including two controllers with direct control over the vehicle's prime movers, which are the controllable sources of angular velocity and torque. These are the hybrid controller 48 and the engine controller (ECM) 46, which provide direct control over the traction motor/generator 32 and thermal engine 28. For the purposes of the present application, the possibility of using vehicle kinetic energy as a source of angular velocity and torque for any purpose other than to backdrive the traction motor/generator 32 for the generation of electricity or to be dissipated by engine braking is discounted.

ESC 24 is typically directly connected to selected inputs (including sensors 27) and to outputs (such as to headlamps (not shown)). ESC 24 communicates with a dash panel 44 from which it may obtain signals indicating headlight on/off switch position and provide on/off signals to other items, such as dash instruments (not shown). Ignition position is comprehended by a sensors package 27, directly connected to input ports of the ESC 24. Signals relating to activating power take-off operation (PTO), and changing the output levels of the prime movers engaged to support a PTO device 22 such as a hydraulic pump, including angular velocity and torque, may be generated from a number of sources, including an in-cab switch pack 56, an remote switch pack 52 or a remote vernier throttle 54. Signals from the in-cab switch pack 56, remote switch pack 52 and remote vernier throttle 54 are communicated to ESC 24 over one of the vehicle data links, such as a SAE J1708 compliant data link 64 for in-cab switch pack 56 or serial data bus 74 for switch pack 52 (through remote power module 40) and remote verier throttle 54 (through remote engine speed control module (RESMC) 19). SAE J1708 compliant data links exhibit a low baud rate data connection, typically about 9.7K baud and are typically used for transmission of on/off switch states. SAE J1939 compliant data links exhibit much higher data transmission rate and are commonly employed in controller area networks. ESC 24 places the requests into an SAE J1939 defined auxiliary input/output (auxio) message with an eight byte data field to be broadcast over the serial data bus 18 with the requested angular velocity and torque included in the message's data field. ESC 24 does not broadcast explicit thermal engine velocity and torque request messages in response to PTO related operations.

Five controllers in addition to the ESC 24 are illustrated as connected to the serial data bus 18. These controllers include an engine controller 46, a transmission controller 42, a hybrid controller 48, a gauge controller 58 and an anti-lock brake system (ABS) controller 50. Three of these controllers, the transmission controller 42, the hybrid controller 48 and the anti-lock brake system controller (ABS) 50, can be sources of torque/speed messages broadcast over serial data bus 18. The hybrid controller 48 is programmed to respond to the auxiliary input output (auxio) messages from ESC 24 which carry the embedded angular velocity and torque requests relating to PTO device 22 operation. The hybrid controller 48 normally generates angular velocity and torque requests for the engine controller (ECM) 46 relating to operation of the thermal engine 28 to backdrive the traction motor/generator 32 to generate electricity to charge the traction batteries 34. During operation of PTO device 22 the hybrid controller 48 adds or subtracts the velocity and torque change requests from ESC 24 from its own velocity and torque requests as appropriate and broadcasts the result as a angular velocity and torque change message over serial data bus 18.

Otherwise the hybrid drive train 20 operates as a conventional hybrid system with hybrid controller 48, transmission controller 42 and engine controller 46 coordinating operations of the hybrid drive train 20 to select between the engine 28 and the traction motor 32 as the prime mover for the vehicle (or possibly to combine the output of the engine and the traction motor). During vehicle braking these same controllers coordinate disengagement and including potentially shutting down engine 28 and operation of traction motor 32 in its generation mode to recapture some of the vehicle's kinetic energy. The ESC 24 and the ABS controller 50 provide data over serial data bus 18 used for these operations, including brake pedal position, data relating to skidding, throttle position and other power demands such as for PTO device 22. The hybrid controller further monitors a proxy relating to traction battery 34 state of charge (SOC).

Hybrid drive train 20 may be a parallel hybrid diesel electric system in which the traction motor/generator 32 is connected in line with an engine 28 through an auto-clutch 30 so that the engine 28, the traction motor/generator 32, or both in combination, can function as the vehicle's prime mover. In a parallel hybrid-electric vehicle the fraction motor/generator 32 is used to recapture vehicle kinetic energy during deceleration by using the drive wheels 26 to back drive the traction motor/generator 32 thereby applying a portion of the vehicle's kinetic energy to the generation of electricity. The generated electricity is converted from three phase AC by the hybrid inverter 36 and applied to traction batteries 34 as direct current power. In other words the system functions to recapture a vehicle's inertial momentum during braking and convert and store the recaptured energy as potential energy for later use, including reinsertion into the hybrid drive train 20. Thermal engine 28 is disengaged from the other components in hybrid drive train 20 by opening auto-clutch 30 during periods when the traction motor/generator 32 is back driven.

Transitions between positive and negative traction motor/generator 32 electrical power consumption are detected and managed by a hybrid controller 48. Traction motor/generator 32, during braking, generates three phase alternating current which is applied to a hybrid inverter 36 for conversion to direct current (DC) for application to traction battery 34. When the traction motor/generator 32 is used as a vehicle prime mover the flow of power is reversed.

High mass vehicles tend to exhibit poorer gains from hybrid locomotion than do automobiles. Thus electrical power available from fraction battery 34 is often used to power other vehicle systems such as a PTO device 22, which may be a hydraulic pump, by supplying electrical power to the traction motor/generator 32 which in turn provides the motive force or mechanical power used to operate the PTO device 22. In addition, traction motor/generator 32 may be used for starting thermal engine 28.

The various local controllers may be programmed to respond to data from ESC 24 passed to serial data bus 18. Hybrid controller 48 determines, based on available battery charge state, requests for power. Hybrid controller 48 generates the appropriate signals for application to serial data bus 18 for instructing the engine controller 46 to turn thermal engine 28 on and off and, if on, at what power output to operate the engine. Transmission controller 42 controls engagement of auto clutch 30. Transmission controller 42 further controls the state of transmission 38 in response to transmission push button controller 72, determining the gear the transmission is in or if the transmission is to deliver drive torque to the drive wheels 26 or to a hydraulic pump which is part of PTO device 22 (or simply pressurized hydraulic fluid to PTO device 22 where transmission 38 serves as the hydraulic pump) or if the transmission is to be in neutral.

PTO device 22 engagement and PTO load 23 control is implemented through one or more remote power modules (RPMs) 40. Remote power modules 40 are data linked expansion input/output modules dedicated to the ESC 24, which is programmed to utilize them. One RPM 40 functions as the controller for PTO device 22, and provides any hardwire outputs 70 and hardwire inputs 66 associated with the PTO device 22. Position sensors, valve control and the like may also be provided a PTO load 23 which may include elements such as hydraulic motors, boom extensions, etc. Requests for operation of PTO load 23 and, potentially, response reports are applied to the serial data bus 74 for transmission to the ESC 24, which formats the request for receipt by specific controllers or as reports. ESC 24 is also programmed to control valve states through the first RPM 40 in PTO device 22. Remote power modules are more fully described in U.S. Pat. No. 6,272,402 which is assigned to the assignee of the present invention and is fully incorporated herein by reference. "Remote Power Modules" were referred to as "Remote Interface Modules" at the time. A second RPM 40 is illustrated which accepts switching inputs from a switch pack 52 for control of the first RPM 40 (after routing through ESC 24). In addition, RESCM 19 is provided to allow proportional control over the hydraulic PTO using a remote vernier throttle 54. Direct control over thermal engine 28 angular velocity and torque output is implemented through in cab throttle 76 and remote throttle 78 which provide inputs directly to the engine controller 46.

Transmission controller and ESC 24 both operate as portals and/or translation devices between the various data links and serial data buses 68, 18, 74 and 64. Data link 68 and serial data bus 74 may be proprietary and operate at substantially higher baud rates than does the serial data bus 18. Accordingly, buffering is provided for messages passed between data links. Additionally, a message may have to be reformatted, or a message on one link may require another type of message on the second link, e.g. a movement request over serial data bus 74 may translate to a request for transmission engagement from ESC 24 to transmission controller 42. Serial data buses and links 18, 68 and 74 are usually controller area network buses which conform to the SAE J1939 protocol.

The modification of the messaging scheme, while retaining SAE J1939 provided message types, creates a logical series relationship between the engine controller 46, the hybrid controller 48, and the ESC 24. Such a logical series approach allows the ESC 24 to broadcast auxiliary datalink message/s containing various thermal engine 28 angular velocity and torque level change requests which are only known to the hybrid controller 48. Because of the auxiliary character of these messages, the engine controller 46 does not recognize or respond to the messages. However, the hybrid controller 48 does recognize the messages and manages its own desired variable requests for the thermal engine 28 along with those of the ESC 24 and broadcasts the combined requests in the form of a single source messaging structure in the conventional format that the engine controller 46 recognizes. This virtually eliminates the conflicting responses introduced by use of parallel message structures where the hybrid controller 48 and the ESC 24 can compete with one another for some level of control of the thermal engine 28.

The existing vehicle CAN is exploited to monitor and control the operation of the chassis hybrid electric vehicle components, systems and subsystems as well as truck equipment manufactures' (TEM) truck mounted equipment. The components, systems, subsystems and TEM mounted equipment monitored include the thermal engine's 28 angular velocity through the hybrid controller 48 as well as TEM and input signals coming from chassis and/or the TEM devices requesting changes in the angular velocity of the thermal engine 28 and the hybrid electric traction motor/generator 32 as primary movers.

The present CAN communication strategy mediates requests originating with TEM mounted engine speed control devices, for example discrete switches, vernier devices and the like which are integrated into the existing CAN bus environment through elements such as remote power modules and remote engine speed control modules which operate through a body controller and the hybrid controller. The effective logical relationship between the engine controller, the hybrid controller and the body controller is altered. This substantially reduces conflict introduced by parallel angular velocity and engine torque message structures from differing sources where the hybrid controller and body controller compete with one another for some level of control of the thermal engine 28. The modification is minimal since it can be implemented using existing vehicle hardware and software architectures.

What is claimed is:

1. A drive train and control system therefore, comprising:
    a first prime mover;
    a second prime mover;
    a transmission coupled to absorb power from the first prime mover or the second prime mover;
    a power take-off application operable from the transmission for absorbing power from the first prime mover or the second prime mover;
    means for selecting an operating speed for the power take-off application;
    a first controller for the first prime mover;
    a second controller for the second prime mover programmed to generate change requests operated on by the first controller for varying output of the first prime mover;
    a third controller programmed to generate requests for changes in output from the first prime mover;
    a communication link connecting the first, second and third controllers; and
    the second controller being programmed to respond to the requests for conflating the requests with the change requests and transmitting conflated change requests over the communication link and the first controller being programmed to respond to the conflated change requests.

2. A drive train and control system of claim 1, further comprising:
    the first prime mover being a thermal engine; and
    the second prime mover being an electric traction motor and generator.

3. A drive train and control system of claim 2, further comprising:
    the first controller being a thermal engine controller;
    the second controller being a hybrid controller; and
    the third controller being a vehicle body controller.

4. A drive train and control system as set forth in claim 3, further comprising:
    the source of requests including controls for the power take-off application.

5. A drive train and control system as set forth in claim 4, further comprising:
    the communication link and the first, second and third controllers operating as a controller area network.

6. A drive train and control system as set forth in claim 5, further comprising:
    the thermal engine being an internal combustion engine.

* * * * *